United States Patent [19]

Chang

[11] 4,067,849

[45] Jan. 10, 1978

[54] POLYESTER PREPARE FROM A MIXTURE OF ISOPHTHALIC ACID, AZELAIC ACID, TRIMETHYLPENTANEDIOL AND BISPHENOL A

[75] Inventor: Robert C. Chang, Newark, Ohio

[73] Assignee: Owens-Corning Fiberglas Corporation, Toledo, Ohio

[21] Appl. No.: 583,944

[22] Filed: June 5, 1975

[51] Int. Cl.² .............................................. C08G 63/18
[52] U.S. Cl. .............................. 260/47 C; 260/29.2 E; 260/40 R; 428/430; 428/431
[58] Field of Search ............... 260/47 C, 29.2 E, 40 R

[56] References Cited

U.S. PATENT DOCUMENTS 3,635,899  1/1972  Doerr et al. ........................ 260/75 M
3,697,479  10/1972  Maycock ............................ 260/47 C Primary Examiner—Lester L. Lee
Attorney, Agent, or Firm—John W. Overman; Philip R. Cloutier; Dennis M. Kozak

[57] ABSTRACT

A glass size composition comprising a polyester, the polyester comprising the reaction product of (1) a mixture of acids consisting essentially of isophthalic acid and azelaic acid and, (2) a mixture consisting essentially of trimethylpentanediol and bisphenol A is disclosed.

5 Claims, No Drawings

POLYESTER PREPARE FROM A MIXTURE OF ISOPHTHALIC ACID, AZELAIC ACID, TRIMETHYLPENTANEDIOL AND BISPHENOL A

This invention relates to polyester film-formers for glass fiber reinforced polyesters.

In one of its more specific aspects, this invention relates to the production of film-formers for inclusion in glass fiber sizings which facilitate the reinforcing properties of the glass fibers when incorporated in resins, principally polyesters.

The use of glass fibers as reinforecement for resins is well known. In general, incorporation of glass fibers into the resin matrix enhances the physical properties of the polymers. The ability of the glass fibers to reinforce the resin is largely a function of the size applied to the fiber surface.

There are several major components which are employed in sizes for glass fiber used as reinforcements for resins. These include coupling agents, lubricants and film formers. Presently most of the film formers used in sizes for fiber glass reinforced polyester resins are epoxy derivatives. However, epoxy derivatives have several important disadvantages including high costs, toxicity and slowness of initial wet-out of the sized fiber by the polyester resin.

Accordingly, it is an object of the present invention to provide an epoxy-substitute for inclusion in glass fiber sizes.

It is another object of this invention to develop a polyester-bases size component providing compatability between the polyester of the size and the resin, particularly polyester resins.

Accordingly, there is provided by the present invention a glass size composition comprising a polyester, the polyester comprising the reaction product of (1) a mixture of acids consisting essentially of isophthalic acid and azelaic acid and, (2) a mixture consisting essentially of trimethylpentanediol and bisphenol A.

Also according to this invention there is provided at least one glass fiber, at least a portion of the surface of said glass fiber being in contact with the reaction product of (1) a mixture of acids consisting essentially of isophthalic acid and azelaic acid and, (2) a mixture consisting essentially of trimethylpentanediol and bisphenol A.

Also, according to this invention there is provided a resin reinforced with a glass fiber sized with a composition comprising the reaction product of (1) a mixture of acids consisting essentially of isophthalic acid and azelaic acid and, (2) a mixture consisting essentially of trimethylpentanediol and bisphenol A.

In the best mode of practicing the invention the reinforced resin will be a polyester resin.

The polyesters which serve as film formers of the present invention are formed by a condensation reaction of the acidic and glycolic components, preferably in the presence of a catalyst such as dibutyltin oxide.

The reactants can be employed in the following quantities:

| Mols | Range | Preferred |
| --- | --- | --- |
| Isophthalic Acid | 3 – 3.5 | 3.2 |
| Azelaic Acid | 0.6 – 1.0 | 0.8 |
| Trimethylpentanediol | 4.6 – 5.0 | 4.8 |
| Bisphenol A | 0.3 – 0.5 | 0.4 |

As will be seen from the above, the isothalic acid will be employed in an amount within the range of from about 3 to about 6 moles per mol of azelaic acid. The trimethylpentanediol will be employed in an amount within the range of from about 9 to about 17 mols per mol of bisphenol A, and the total acids will be employed in an amount within the range of from about 0.65 to about 0.95 mol per mol of the total of the trimethylpentanediol and bisphenol A.

The reaction is conducted under usual polymerization techniques to produce a polyester having an acid number of from about 25 to about 65 and a molecular weight of about 3,000.

The polyester so formed can be incorporated into any aqueous size composition in which it can be included in an amount within the range of from about 0.5 to about 3 percent by weight of the total size composition.

The size composition can include surfactants, lubricants, coupling agents, and acids for pH adjustment. These components wil be included in prior art quantities. For example, the lubricant will be included in an amount within the range of from about 1 to about 2 weight percent, the coupling agent, or agents, will be included in a total amount within the range of from 1 to about 2 weight percent, and acid will be employed to produce a size having a pH of about 4.0. Preferably, the aqueous medium will comprise deionized water.

All materials such as the surfactants, lubricants and coupling agents are commercially available and known in the art. For example, suitable lubricants include "Tween 85," a polyoxyethylene sorbitan trioleate available from Emulsion Engineering, Inc. and "PEG 400 MS" available from Emery Industries.

Similarly, suitable coupling agents include "A-174," gamma-methocryloxypropyltrimethoxy silane and "A-1100," gamma-aminopropyltriethoxy silane, both available from Union Carbide Corporation.

A suitable acid, employable for pH adjustment is acetic acid.

The polyester size of this invention can be employed with any glass fiber. Preferably, it will be applied to the glass fiber in such a manner that the glass fiber, after drying, retains a solid residue comprising from about 0.5 to about 3 percent by weight of the glass fiber.

The glass fiber of this invention can be employed as a reinforcement for any resin. Preferably, however, it is employable to reinforce propylene-maleate-based polyesters.

The following examples illustrate the production of the polyester film former and the polyester size of this invention.

EXAMPLE I

Into a reactor were charged 3.2 mols isophthalic acid (95%), 4.8 mols trimethylpentanediol, 0.4 mol bisphenol A, and 3.6 g dibutyltin oxide to form a reaction mixture.

Nitrogen was introduced into the reactor at a rate of 25 ml/min. while gradually increasing the temperature of the reaction mixture to 200° C over about 5½ hours, during which period distillate was being taken overhead and at the end of which period the mixture had an acid number of about 181.

At the end of about 10 hours, about 0.3 g of dibutyltin oxide and about 0.8 mole of azelaic acid were added, the acid number of the reaction mixture at the end of 10 hours being about 55. The reaction was terminated at about 11½ hours when the acid number reached about 50. The reaction mixture was allowed to cool to about 100° C and an amount of surfactant, (Pluronic F108, commercially available from Wyandotte Chemical Corp.) approximately 135 g., were added. About 1500 g. of water were then added and the mixture was agitated to produce an oil-in-water emulsion containing about 50% total solids.

EXAMPLE II

The polyester film former, produced in Example I, in aqueous emulsion form, was formulated into aqueous sizes in accordance with the following compositions and procedures.

|  | Composition, Weight % | |
| --- | --- | --- |
|  | Size I | Size II |
| Polyester film former emulsion | 0.5 (solid) | 3.0 (solid) |
| Lubricant | 1.5 | 1.2 |
| Silane Coupling Agent I | 1.1 | 1.1 |
| Silane Coupling Agent II | 0.33 | 0.30 |
| Acetic Acid | 0.24 | 1.24 |
| Deionized Water | Balance | Balance |

In both instances, the sizes were prepared according ot the following procedure.

About two-third of the total deionized water was charged to a vessel. The acetic acid was introduced and the silane coupling agent I was added, the mixture being agitated until clear. Silane coupling agent II was then added and the mixture was again stirred until clear.

The polyester film-former emulsion, diluted with one-third of the required deionized water, was then added, with stirring, to the mixture. The lubricant was then added and the mixture was stirred for about 10 minutes to produce an aqueous size.

The aqueous size of the invention is applied to glass fibers in the usual manner. When so employed, the aqueous size of this invention compares favorably with a comparable epoxy-based size as indicated by the following results:

| Evaluation | Epoxy-Based Size | Polymer-Based Size |
| --- | --- | --- |
| Forming | Good | Good |
| Migration Index | 4.26 | 3.4 |
| Initial Wet Out | Good | Good |
| Initial Clarity | Very Good | Very Good |
| Flexural Strength (Psi × 10$^3$) | | |
| Dry | 165 | 178 |
| Wet | 176 | 171 |
| Wet Rentention (%) | 106.5 | 96.2 |
| Ignition loss | 35.3 | 35.0 |

The sized glass fibers can be handled, after sizing, in the usual manner; that is, for example, they can be gathered into packages from which they can be introduced as reinforcing into the resin system.

It will be evident from the foregoing that various modifications can be made to this invention. Such, however, are considered as being within the scope of the invention.

What is claimed is:

1. A composition comprising a polyester, the polyester comprising the reaction product of:
    a. a mixture of acids consisting essentially of isophthalic acid and azelaic acid; and,
    b. a mixture consisting essentially of trimethylpentanediol and bisphenol A.
2. The composition of claim 1 in which said isophthalic acid is employed in an amount within the range of from about 3 to about 6 mols per mol of azelaic aicd.
3. The composition of claim 1 in which said trimethylpentanediol is employed in an amount within the range of from about 9 to about 17 mols per mol of bisphenol A.
4. The composition of claim 1 in which said mixture of acids is employed in an amount within the range of from about 0.65 to about 0.95 mol per mol of the total of said trimethylpentanediol and said bisphenol A.
5. The composition of claim 4 in which said polyester has a molecular weight of about 3,000.